US011693858B2

(12) United States Patent
Chen et al.

(10) Patent No.: US 11,693,858 B2
(45) Date of Patent: Jul. 4, 2023

(54) ACCESS PATH OPTIMIZATION

(71) Applicant: INTERNATIONAL BUSINESS MACHINES CORPORATION, Armonk, NY (US)

(72) Inventors: Xiao Xiao Chen, Beijing (CN); Xiaobo Wang, Haidian District (CN); Shuo Li, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 16/931,494

(22) Filed: Jul. 17, 2020

(65) Prior Publication Data
US 2022/0019587 A1 Jan. 20, 2022

(51) Int. Cl.
G06F 16/00 (2019.01)
G06F 16/2453 (2019.01)

(52) U.S. Cl.
CPC .. G06F 16/24549 (2019.01); G06F 16/24545 (2019.01)

(58) Field of Classification Search
CPC ......... G06F 16/24549; G06F 16/24545; G06F 16/24542; G06F 16/217
See application file for complete search history.

(56) References Cited

U.S. PATENT DOCUMENTS

| 6,006,220 | A | 12/1999 | Haderle |
| 7,080,062 | B1 | 7/2006 | Leung |
| 2005/0060285 | A1 | 3/2005 | Barsness |
| 2017/0017686 | A1* | 1/2017 | Feng ................. G06F 16/24545 |
| 2017/0116275 | A1* | 4/2017 | Baggett ............. G06F 16/24549 |
| 2019/0303476 | A1* | 10/2019 | Williamson ...... G06F 16/24539 |
| 2021/0240713 | A1* | 8/2021 | Kondiles ........... G06F 16/24568 |

FOREIGN PATENT DOCUMENTS

EP 2926274 A4 7/2016

OTHER PUBLICATIONS

Mell et al., "The NIST Definition of Cloud Computing", National Institute of Standards and Technology, Special Publication 800-145, Sep. 2011, 7 pages.

\* cited by examiner

Primary Examiner — Cheryl Lewis
(74) Attorney, Agent, or Firm — Michael O'Keefe

(57) ABSTRACT

A computer-implemented method for access path optimization is provided according to embodiments of the present disclosure. In the method, a plurality of real values of an access path factor may be collected during a specified time period. One of the real values may be generated when a query is executed on a first access path. Then, at least one second access path may be generated for the query based on the plurality of real values of the access path factor. Moreover, an optimal access path for the query may be identified from the first access path and the at least one second access path.

20 Claims, 7 Drawing Sheets

ACCESS PATH OPTIMIZATION

BACKGROUND

The present invention relates to data processing, and more specifically, to optimization in database systems.

Relational databases store data by organizing the data into predefined data categories in a form of related tables. The data within the relational databases may be accessed through a query by using high-level query languages, such as Structured Query Language (SQL). The query, which may be represented by a SQL statement, denominates a set of commands for retrieving data from the relational databases.

For a same query, different access paths may result in much different performance in a same situation. For example, a complex query can run successfully within seconds by using a good access path, while the query cannot complete after running hours with a bad one. Therefore, there is a need to select an efficient access path to execute the query against the relational database, in order to minimize costs of performing the query.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one embodiment of the present invention, there is provided a computer-implemented method for access path optimization. In the method, a plurality of real values of an access path factor may be collected during a specified time period. One of the real values may be generated when a query is executed on a first access path. Then, at least one second access path may be generated for the query based on the plurality of real values of the access path factor. Moreover, an optimal access path for the query may be identified from the first access path and the at least one second access path.

According to another embodiment of the present invention, there is provided an apparatus for access path optimization. The apparatus may comprise one or more processing units, a memory coupled to at least one of the processing units, and a set of computer program instructions stored in the memory. The set of computer program instructions may be executed by at least one of the processing units to perform the above method.

According to another embodiment of the present disclosure, there is provided a computer program product for access path optimization. The computer program product may comprise a computer readable storage medium having program instructions embodied therewith. The program instructions executable by a processor causes the processor to perform the above method.

In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
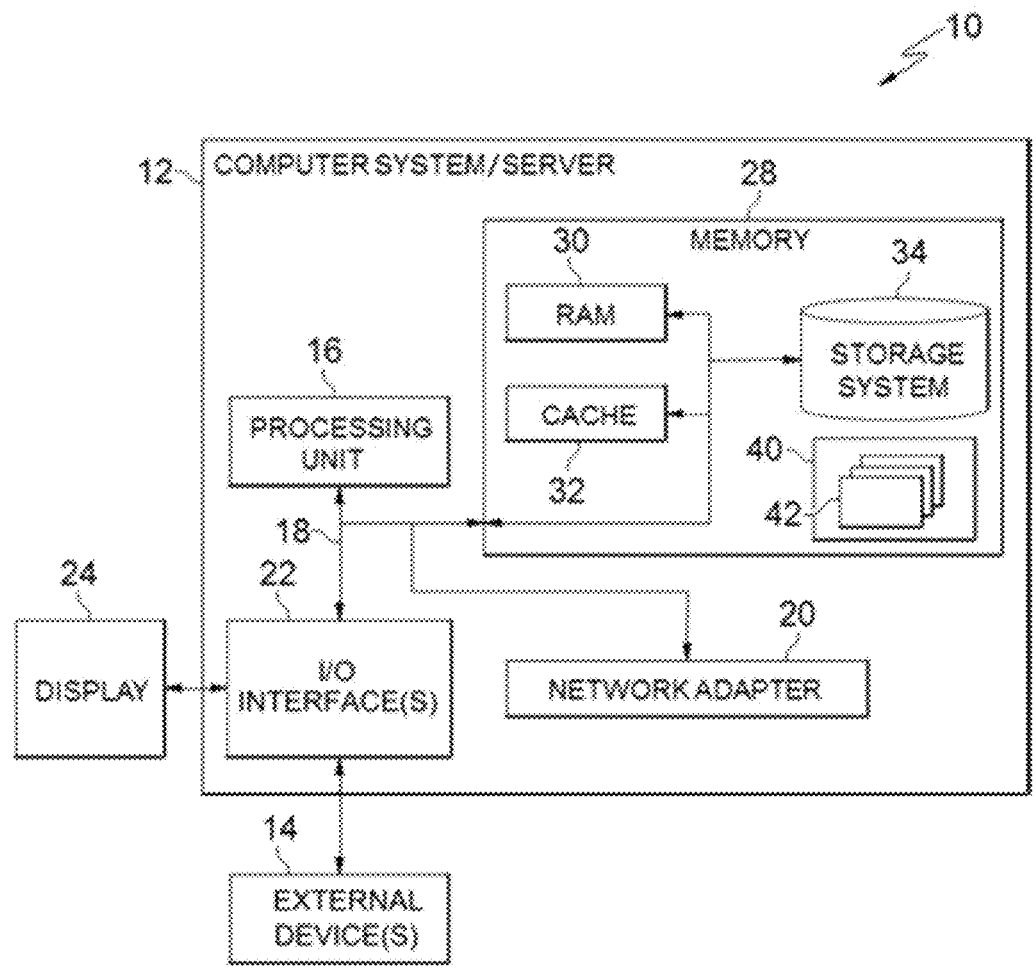
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
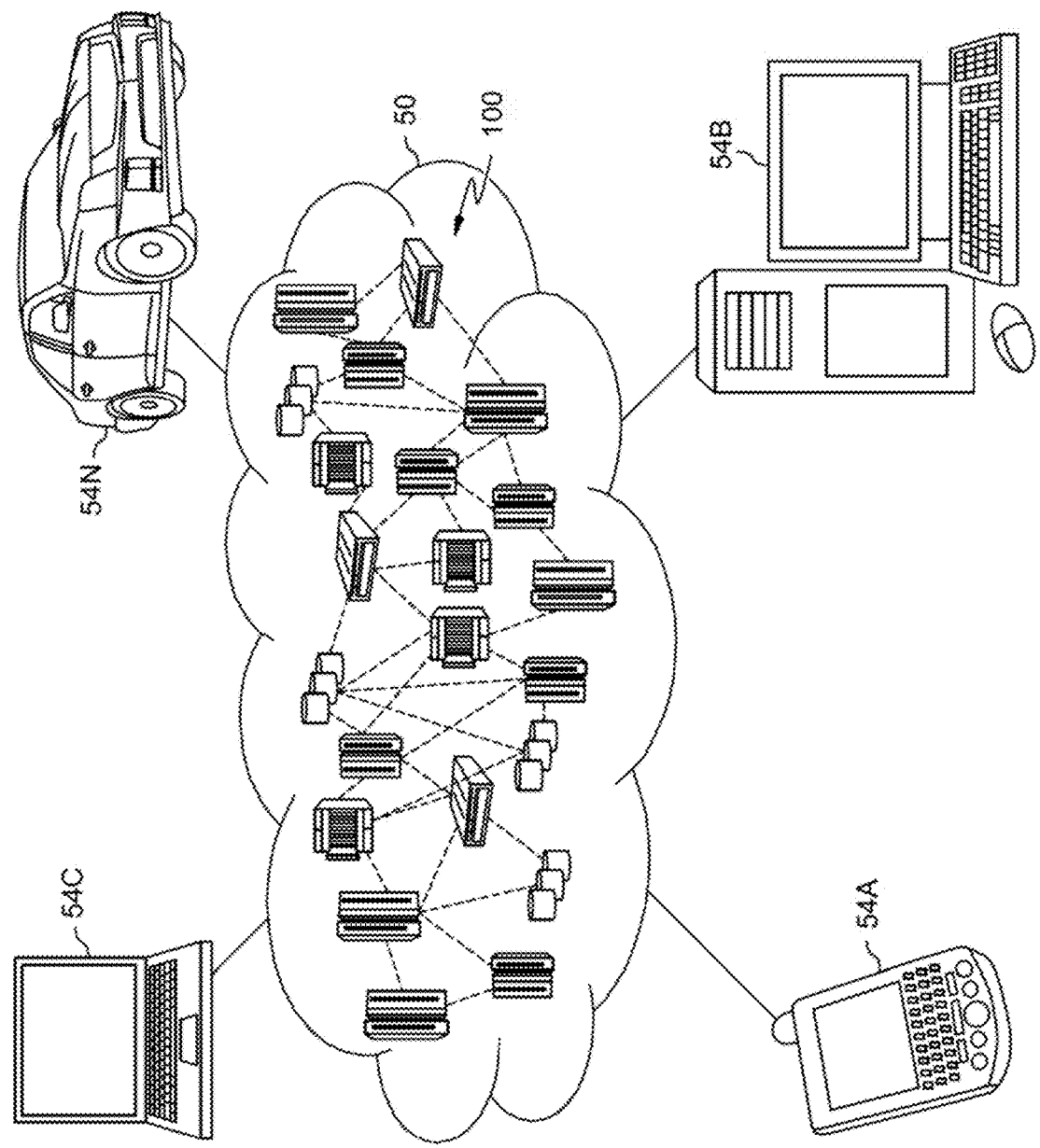
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
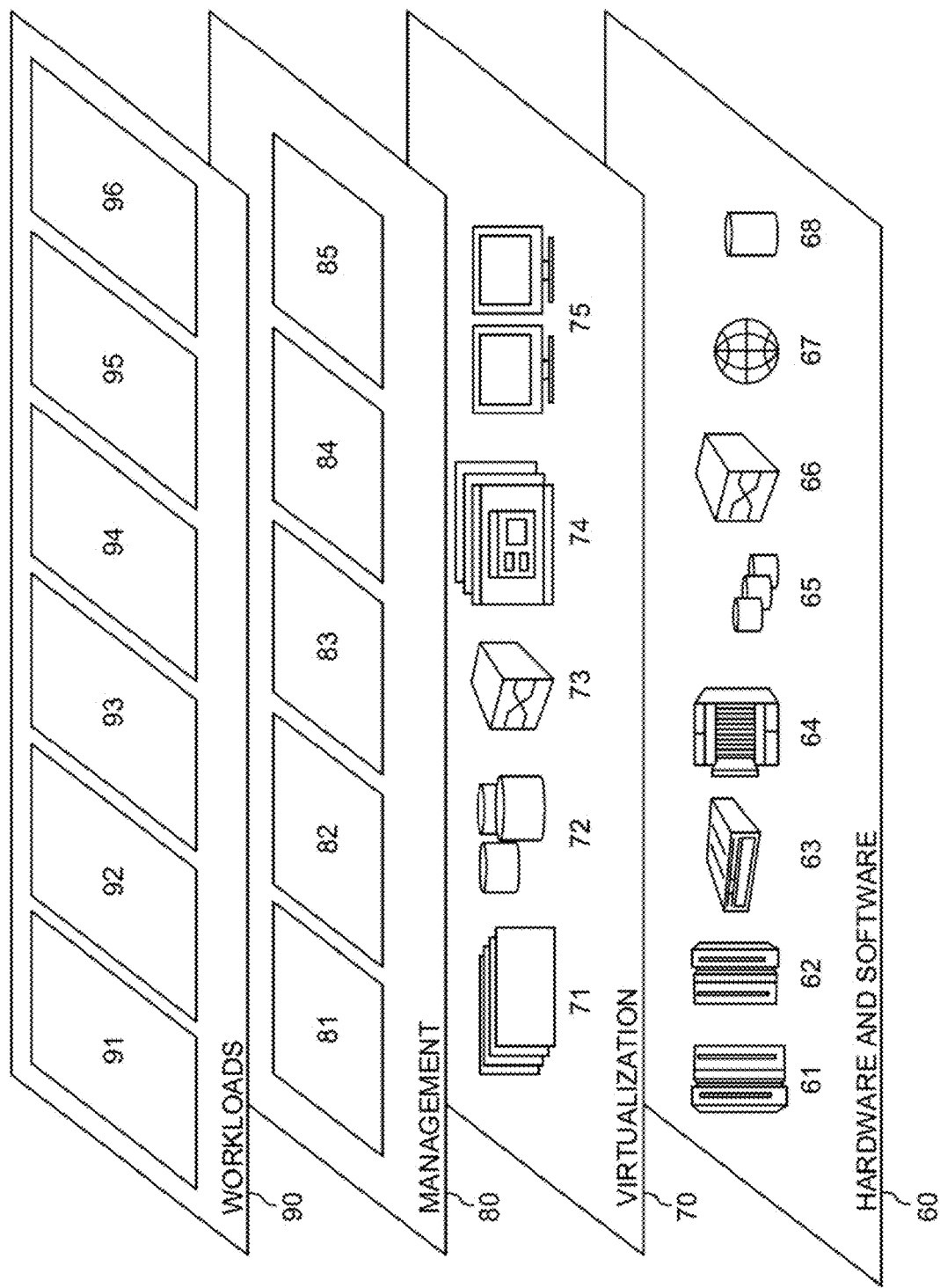
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and access path optimization 96.

Self tuning and optimization for a database system is very significant especially under a cloud platform. One of the most critical indicators on database tuning/optimization is whether an optimal access path for a query could be selected.

Conventionally, a query optimizer of the database system optimizes an access path for a query based on estimated costs which is calculated based on catalog statistics and system resources. However, there are a plurality of access path (AP) factors that may impact cost estimation and thus the access path selection.

During access path selection phase in a bind time, the AP factors cannot be obtained precisely. Even if during runtime, for dynamic SQL statements, most of the AP factors, such as data skew degree and filter factor, are various and cannot be calculated accurately. Therefore, a final selected access path may likely be sub-optimal.

In an aspect, a user may notice an access path for a query is unsatisfactory due to slow execution time. The user may try to recollect statistics and rebind the SQL statements for better access path selection. If the problem still exists, the user needs to continue to diagnose. However, production may be impacted if the access path cannot provide good performance any more. In addition, with the data changing, the user may need to recollect statistics frequently, which is time and resource consuming. Moreover, even latest statistics cannot make the AP factors calculated precisely.

In another aspect, a user may always bind a dynamic SQL statement at run-time rather than use dynamic statement cache for better access path selection. However, performing a bind process every time against each dynamic SQL statement may consume significant CPU resources, while the AP factors cannot be calculated precisely even in run-time.

Figure 4:
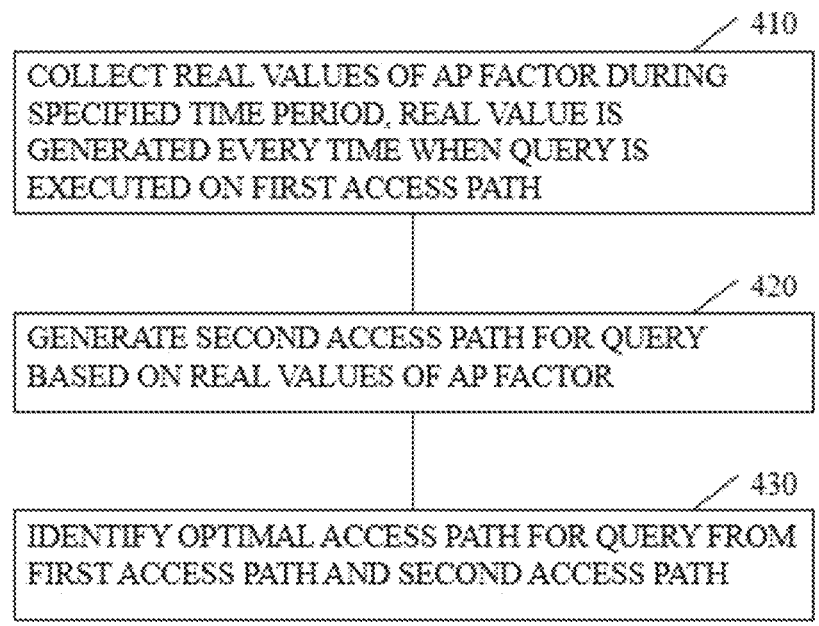
FIG. 4 depicts a schematic flowchart illustrating a method for optimizing access path according to an embodiment of the present disclosure.

Embodiments of the present disclosure provide a method for optimizing an access path for a query based on real-time information. FIG. 4 shows a schematic flowchart of a method for access path optimization according to an embodiment of the present disclosure.

It can be noted that the processing of access path optimization according to embodiments of this disclosure could be implemented by a computing device, for example, the computer system/server 12 of FIG. 1.

At block 410, the computer device collects a plurality of real values of an access path (AP) factor during a specified time period. One of the real values is generated when a query is executed on a first access path.

Initially, the first access path may be determined as an original access path based on a plurality of methods. In some embodiments, the first access path may be a preset access path. In another embodiment, the first access path may also be calculated based on status of system resources, default statistics, default AP factors, and the like. In alternative embodiments, the first access path may also be generated based on a method for access path optimization, for example, according to embodiments of the present disclosure.

In some embodiments, during the specified time period, the query is executed on the first access path for a plurality of times to retrieve data from a database. Correspondingly, the plurality of real values for at least one AP factor may be generated. For example, with respect to each of the at least one AP factor, a real value may be generated when a query is executed on a first access path. The database being requested may comprise one or more related tables, each table comprising one or more data pages consisting of columns and rows.

For example, the AP factor may comprise, but not limited to, filter factor, pre-fetch efficiency (i.e., reduction ratio), buffer pool hit ratio, sort pool size, value of parameter/host variables, and/or the like. A real value of the filter factor may be calculated as the actual number of rows divided by total number of rows in the table. The actual number of rows may be obtained after a local predicate is applied. A real value of the pre-fetch efficiency may be calculated as the actual number of data pages loaded by synchronized I/O divided by the number of pre-fetched pages. The actual number of data pages may also be obtained after the local predicate is applied. A real value of the buffer pool hit ratio may be calculated as the number of pages found in buffer pool divided by the actual number of data pages. Other AP factors and their real values may also be calculated and used herein.

In a further environment, the specified time period may be any time period, such as eight hours, a day, a month, or the like. For example, the method may be implemented with respect to an office hour of a day, such as, from 9:00 A.M. to 5:00 P.M.

Moreover, the collected real values may be saved in a memory, for example, the memory 28 in FIG. 1 or an online database coupled to the computer device. In an example, the collected real values may be saved in combination with time information indicating when the query is actually executed.

With reference to FIG. 4, at block 420, the computer device generates a second access path for the query, based on the plurality of real values of the access path factor. For example, one or more second access paths may be generated.

In some embodiments, the computer device may calculate an average value of the collected real values for the AP factor. For example, as real values of the filter factor, real values of pre-fetch efficiency and real values of the buffer pool hit ratio are collected during the specified time period, an average value of the filter factor, an average value of the pre-fetch efficiency, and an average value of the buffer pool hit ratio may be calculated respectively.

Then, the computer device may calculate the second access path based on the average value. In the above example, the computer device may calculate at least one second access path based on the average value of the filter factor, the average value of pre-fetch efficiency, and the average value of the buffer pool hit ratio. In some cases, the computer may comprise a database optimizer or may be coupled with a database optimizer.

Moreover, at block 430, the computer device identifies an optimal access path for the query from the first access path and the second access path.

In some embodiments, run-time environment, under which the query is executed on the first access path for the specified time period, may be saved in the memory. The run-time environment may be associated with conditions of the requested database, system setups for executing the query, and the like. Thus, the computer device may access the run-time environment in the memory and replay it to create a same run-time environment for executing the query on the second access path.

In some embodiments, the computer device may calculate, based on the same run-time environment, a first execution cost associated with executing the query on the first access path and a second execution cost associated with executing the query on the second access path. The execution cost may comprise Central Processing Unit (CPU) cost and Input/Output (I/O) cost. The computer device may calculate the CPU cost by applying statistics and a filter factor based on the statistics to the base cost, page cost, scan cost, and row cost associated with the query. The computer device may calculate the I/O cost based on statistics, filter factor, pre-fetch efficiency, buffer hit ratio, and the like. The computer device may also calculate an overall execution cost for the respective access paths by multiplying the calculated CPU cost and I/O cost by resource usage weights and combining the results. For example, execution cost=CPU Cost*CPU weight+I/O Cost*I/O weight.

Therefore, the computer device may identify one of the first access path and the second access path based on whichever has the lower execution cost, as the optimal access path. For example, the computer device may compare the first execution cost and the second execution cost. If the first execution cost is higher than the second execution cost, the second access path may be determined as the optimal access path. Otherwise, if the first execution cost is not higher than the second execution cost, the second access path may be determined as the optimal access path.

In some embodiments, the computer device may save the first access path and the second access path in a catalog table, and set the optimal access path as active, for future use.

Then, the computer device may execute the query on the optimal access path during a further time period, which corresponds to the specified time period. For example, if the query was executed on the first access path from 7:00 A.M. to 7:00 P.M. of a day, the computer device may further execute the query on the identified optimal query from 7:00 A.M. to 7:00 P.M. of another day in a similar run-time environment.

According to the method of the present disclosure, the access path of the query can be optimized based on real time information, for example, real values of AP factors collected in run-time environment. Thus, execution cost for executing the query for a further time period may be significantly reduced.

As an example, an example query is shown as follows.
WITH SALE(C1, C2, C3) AS
(SELECT SALE_CUR.C1, SALE_CUR.C2, SALE_CUR.C3
FROM SALE_CUR
WHERE SALE_CUR.C1=?
AND SALE_CUR.C4<?
UNION ALL
SELECT SALE_HST.C1, SALE_HST.C2, SALE_HST.C3
FROM SALE_HST
WHERE SALE_HST.C1=?
AND SALE_HST.C4<?)
SELECT EMP.C1, EMP.C3 FROM EMP
WHERE EMP.C1=SALE.C1
AND EMP.C2=SALE.C2
AND EMP.C3=?;

In this example query, SALE indicates a table whose body includes UNION ALL. An original access path may be calculated based on default statistics, such as table card, column card, or the like. For example, the original access path may be selected as sort merge join when EMP join SALE with picking up join predicate EMP.C1=SALE.C1.

During a database system, for example, the computer device as described above, execute the example query with the original access path, real time information, such as information of data fetching, status of system resources, or the like, may be collected. For example, the database system may use index IXS1(SALE_CUR.C4) with list prefetch to access table SALE_CUR, for example, to obtain retrieved RIDs number, and how many rows are returned after apply predicate SALE_CUR.C1=?. When accessing SALE as inner table, the database system may detect the total rows of SALE and the column card of SALE.C1, SALE.C2, SALE.C3. Additionally, the database system may detect the usage of RID pool and temporal storage for sort.

All information collected above may be used to repair the original access path. For example, if the database system wants to retrieve huge RIDs when accessing table SALE_CUR, the database system needs to adjust the execution cost. In this case, if the database system determines that IXS2(SALE_CUR.C1) can provide better performance (for example, lower cost), it may update the original access path to a new access path IXS2. In another side, the database system can detect that all rows on SALE are probed when outer table is EMP. The join predicate EMP.C1=SALE.C1 cannot provide good filtering for SALE. After access path updated, the database system may pick another predicate EMP.C2=SALE.C2 to do sort merge join, which can provide better performance.

Figure 5:
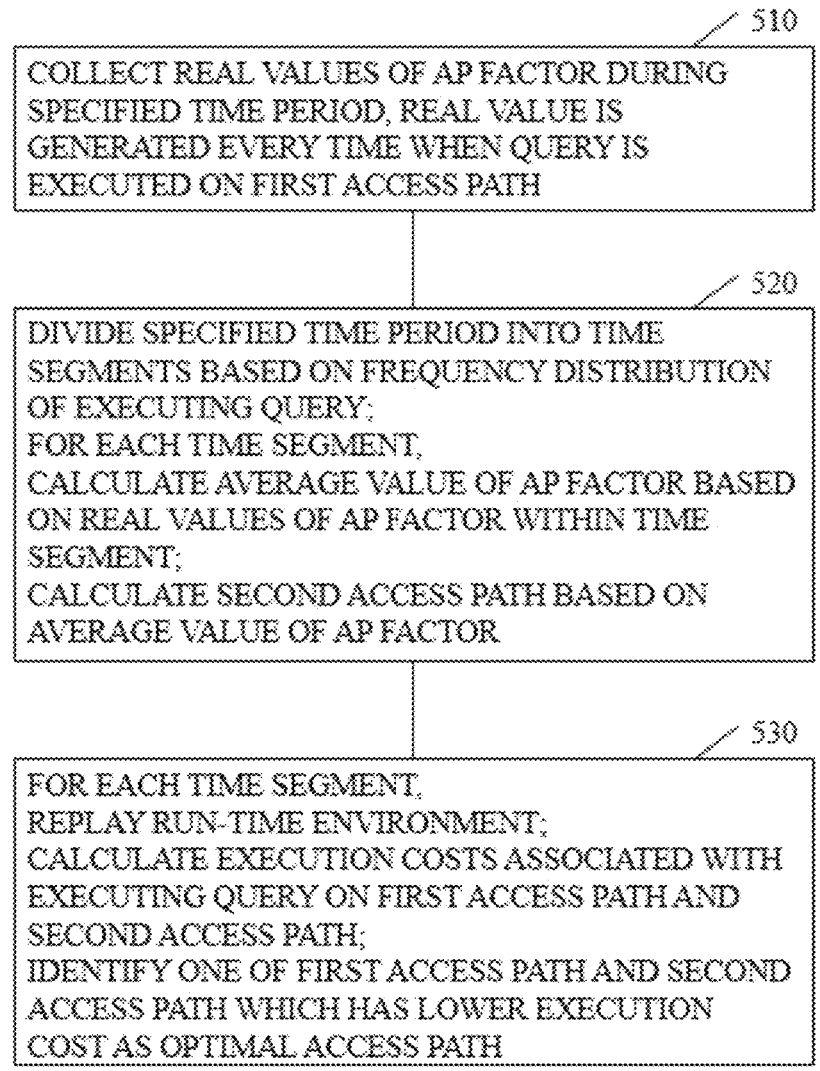
FIG. 5 depicts a schematic flowchart illustrating a method for optimizing access path according to an embodiment of the present disclosure.

Embodiments of the present disclosure also provide a method for optimizing an access path for a query based on real-time information and an execution frequency of the query. FIG. 5 shows a schematic flowchart of a method for access path optimization according to an embodiment of the present disclosure.

At block 510, the computer device collects a plurality of real values of an access path (AP) factor during a specified time period. One of the real values is generated when a query is executed on a first access path. The procedure in block 510 is similar with the procedure in block 410. Thus, similar description will not be repeated herein.

In some embodiments, the computer device may also record the time information indicating when the query is executed. Thus, the computer device may determine the number of times the query is executed per unit time, such that a frequency distribution of executing the query can be obtained. At least one second access path may be generated based on the frequency distribution of the query execution, in some embodiments.

As shown in FIG. 5, at block 520, the computer device divides the specified time period into a plurality of time segments, based on the frequency distribution of executing the query. The computer device may calculate, for each time segment, an average value of the AP factor based on the plurality of real values of the AP factor within the time segment. Then, the computer device may calculate, for each time segment, at least one second access path based on the average value of the AP factor within the time segment.

It can be understood that, the second access path generation process with respect to each time segment is similar with the second access path generation process with respect to the whole specified time period which has been described in the embodiments above. For a specific method, reference may be made to the embodiments associated with block 420 in FIG. 4.

In some embodiments, cluster algorithms may be applied against the frequency distribution of the query execution, such that the specified time period may be divided into the plurality of time segments. Specifically, the query may be executed very intensively during some of the time segments, while the query may be executed less frequently during some other time segments.

Figure 6:
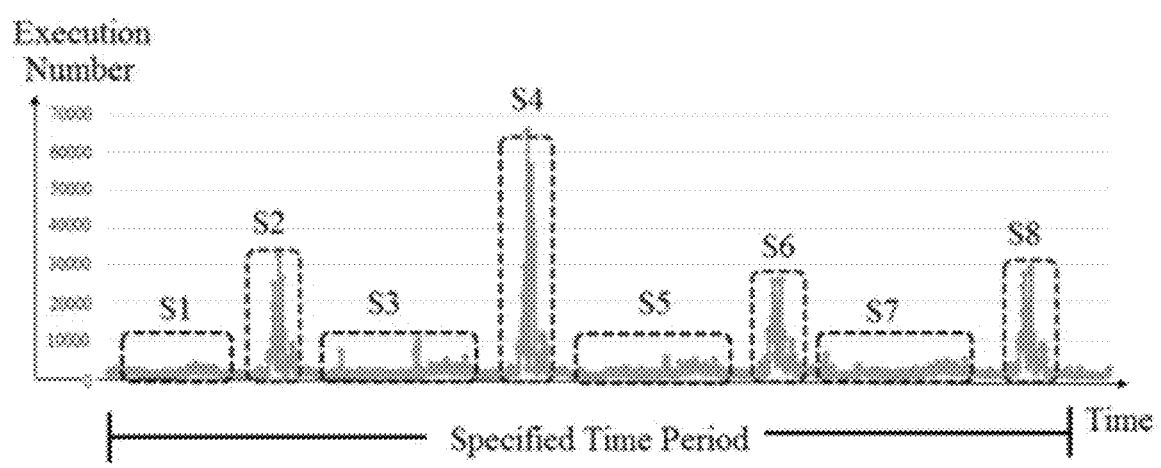
FIG. 6 depicts a schematic diagram of an example illustrating a frequency distribution of executing a query.

FIG. 6 shows a schematic diagram of an example illustrating a frequency distribution of the query execution during a specified time period. The horizontal axis (Time) represents time and the vertical axis (Execution number) represents the number of times the query is executed. As shown in FIG. 6, the whole time period can be divided into eight time segments, which are S1, S2, S3, S4, S5, S6, S7, and S8.

As seen from FIG. 6, the query is executed in low frequencies during each of the time segments S1, S3, S5, and S7 and in high frequencies during each of the time segments S2, S4, S6, and S8, meanwhile the statistics and system resources may keep changing when the query is executed or a user updates the tables. One access path might not always be able to provide best performance with time going on. Therefore, a corresponding optimal access path may be identified for the respective time segments, to improve efficiency for executing the query during the whole time period.

With reference to block 530, the computer device replays, for each of the time segments, run-time environment under which the query is executed on the first access path within the time segment. The computer device calculates, for each of the time segments, execution costs associated with executing the query on the first access path and the second access path. Then, the computer device identifies, for each of the time segments, an access path which has the lower, or lowest, execution cost, as the optimal access path.

As can be understood that, the optimal access path identification process with respect to each time segment is also similar with the optimal access path identification process with respect to the whole specified time period. For a specific method, reference may be made to the embodiments associated with block 430 in FIG. 4.

Furthermore, the computer device may save the first access path and the at least one second access path for each of the time segments into a catalog table, and set the optimal access path for each of the time segments as active. In some other embodiments, the computer device may only save the optimal access path for each of the time segments into the catalog table.

In some cases, the query may need to be executed during a further time period, which corresponds to the specified time period. For example, the frequency distributions of executing a single query during working hours, such as 9:00 A.M. to 5:00 P.M., may be very similar in different working days, such as Monday to Friday, in some working environments, for example, a bank system.

Therefore, the computer device may first preload the corresponding optimal access path from the catalog table before a start of each of the time segments, and then execute the query on the corresponding optimal access path during each of the time segments. Accordingly, the query may be executed on the efficient access path for all time. Execution cost for executing the query can be significant reduced.

Figure 7:
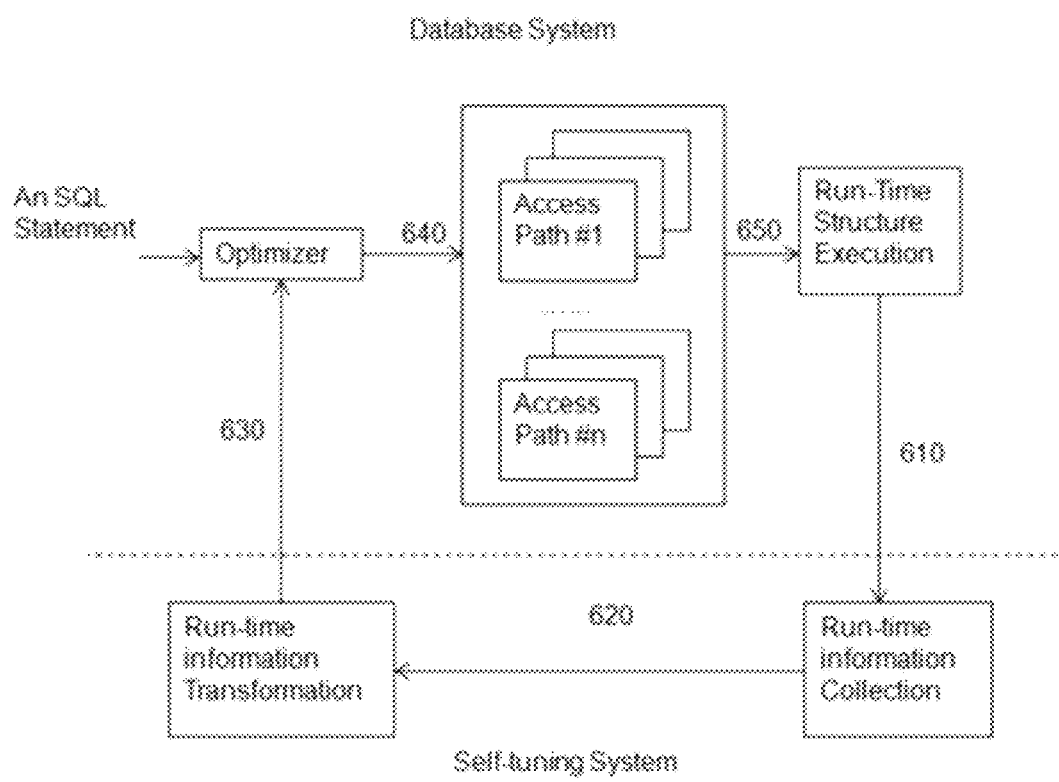
FIG. 7 depicts a schematic flowchart illustrating an exemplary working process for executing a query according to an embodiment of the present disclosure.

Moreover, the computer device may repeat the above processes of collecting real values, generating new access path, and identifying the optimal access path, to realize a self-tuning and optimizing process for a database system. FIG. 7 shows a schematic diagram of a flowchart illustrating a working process of executing an SQL statement according to embodiments of the present disclosure. The self-tuning system may be implemented by the computer device based on the above methods, or may be included in the database system.

As shown in FIG. 7, when a SQL statement input into the database system, an optimizer generates/calculates an original access path based on catalog statistics by normal process (640). The database system may save and load the original access path to execute the SQL statement (650). Then, the self-tuning system may collect run-time information when executing the query (610). For example, the self-tuning system may obtain accurate statistics when data fetching, such as how many rows need to be retrieved after applying one predicate, rows fetched for every probing of outer table, or index cluster ratio, benefit of prefetch, or the like. Additionally, the self-tuning system may monitor all the usage of system resources, such as buffer pool usage, CPU utilization percentage or usage of temporal storage. Then, the self-tuning system may transform the run-time information (620), for example, calculating average value of AP factors for each time segment. All the transformed information can be fed back to optimizer (630) who can regenerate/recalculate the access path based on the transformed real-time information (640). For example, the database system may save original access path and at least one new generated access path in catalog table, for example, with respect each of the time segments. Then, the database system may preload the optimal access path and execute the SQL statement for runtime structure (650).

With this method, the database can update the access path automatically and ensure the optimal performance of the query. This method not only prevents bad performance brought by out of date statistics, but also can get more data than statistics. Additionally, it can consider status of system resource to make sure the query can get optimal performance all the time. Therefore, execution cost associated with executing a query can be significantly reduced, thereby saving time and resource consumption.

Additionally, in some embodiments of the present disclosure, an apparatus for access path optimization may be provided. The apparatus may comprise one or more processing units, a memory coupled to at least one of the processing units, and a set of computer program instructions stored in the memory. The set of computer program instructions may be executed by at least one of the processing units to perform the above method.

In some other embodiments of the present disclosure, a computer program product for access path optimization may be provided. The computer program product may comprise a computer readable storage medium having program instructions embodied therewith. The program instructions executable by a processing unit causes the processing unit to perform the above method.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    collecting, by one or more processing units, a plurality of real values of an access path factor during a specified time period, one of the real values being generated when a query is executed on a first access path;
    generating, by one or more processing units, at least one second access path for the query, based on the plurality of real values of the access path factor, wherein the at least one second access path is calculated based on an average value of a filter factor, an average value of pre-fetch efficiency, and the average value of a buffer pool hit ratio, and wherein the generating further comprises:
        dividing, by one or more processing units, the specified time period into a plurality of time segments, based on a frequency distribution of executing the query, wherein a clustering algorithm is applied against the frequency distribution; and
    identifying, by one or more processing units, an optimal access path for the query from the first access path and the at least one second access path.

2. The computer-implemented method according to claim 1, wherein generating the at least one second access path for the query comprises:
    calculating, by one or more processing units, an average value of the access path factor based on the plurality of real values; and
    calculating, by one or more processing units, the at least one second access path based on the average value of the access path factor.

3. The computer-implemented method according to claim 1, wherein identifying the optimal access path for the query comprises:
    replaying, by one or more processing units, a run-time environment under which the query is executed on the first access path;
    calculating, by one or more processing units, execution costs associated with executing the query on the first access path and the at least one second access path under the run-time environment; and
    identifying, by one or more processing units, one of the first access path and the at least one second access path which has the lower execution cost, as the optimal access path.

4. The computer-implemented method according to claim 1, further comprising:
 executing, by one or more processing units, the query on the optimal access path during a further time period corresponding to the specified time period.

5. The computer-implemented method according to claim 1, wherein dividing each time segment further comprises:
 calculating, by one or more processing units, an average value of the access path factor based on the plurality of real values of the access path factor within the time segment; and
 calculating, by one or more processing units, the at least one second access path based on the average value of the access path factor.

6. The computer-implemented method according to claim 5, wherein identifying the optimal access path for the query comprises:
 for each of the time segments:
  replaying, by one or more processing units, run-time environment under which the query is executed on the first access path within the time segment;
  calculating, by one or more processing units, execution costs associated with executing the query on the first access path and the at least one second access path; and
  identifying, by one or more processing units, one of the first access path and the at least one second access path which has the lower execution cost, as the optimal access path.

7. The computer-implemented method according to claim 6, further comprising:
 saving, by one or more processing units, the first access path and the at least one second access path for each of the time segments into a catalog table; and
 setting, by one or more processing units, the optimal access path as active.

8. The computer-implemented method according to claim 7, further comprising:
 for a further time period corresponding to the specified time period,
  pre-loading, by one or more processing units, the optimal access path corresponding to each of the time segments from the catalog table, before a start of each of the time segments; and
  executing, by one or more processing units, the query on the optimal access path during each of the time segments.

9. The computer-implemented method according to claim 1, wherein the access path factor comprises a buffer pool hit ratio, wherein a value of the buffer pool hit ratio is calculated as a number of data pages found in a buffer pool divided by an actual number of data pages.

10. An apparatus, comprising:
 one or more processing units;
 a memory coupled to at least one of the processing units; and
 a set of computer program instructions stored in the memory and executed by at least one of the processing units in order to perform actions of:
  collecting a plurality of real values of an access path factor during a specified time period, one of the real values being generated when a query is executed on a first access path;
  generating at least one second access path for the query, based on the plurality of real values of the access path factor, wherein the at least one second access path is calculated based on an average value of a filter factor, an average value of pre-fetch efficiency, and the average value of a buffer pool hit ratio, and wherein the generating further comprises:
   dividing, by one or more processing units, the specified time period into a plurality of time segments, based on a frequency distribution of executing the query, wherein a clustering algorithm is applied against the frequency distribution; and
  identifying an optimal access path for the query from the first access path and the at least one second access path.

11. The apparatus according to claim 10, wherein generating the at least one second access path for the query comprises:
 calculating an average value of the access path factor based on the plurality of real values; and
 calculating the at least one second access path based on the average value of the access path factor.

12. The apparatus according to claim 10, wherein identifying the optimal access path for the query comprises:
 replaying a run-time environment under which the query is executed on the first access path;
 calculating execution costs associated with executing the query on the first access path and the at least one second access path under the run-time environment; and
 identifying one of the first access path and the at least one second access path which has the lower execution cost, as the optimal access path.

13. The apparatus according to claim 10, the actions further comprise:
 executing the query on the optimal access path during a further time period corresponding to the specified time period.

14. The apparatus according to claim 10, wherein dividing each time segment further comprises:
 calculating an average value of the access path factor based on the plurality of real values of the access path factor within the time segment; and
 calculating the at least one second access path based on the average value of the access path factor.

15. The apparatus according to claim 14, wherein identifying the optimal access path for the query comprises:
 for each of the time segments:
  replaying run-time environment under which the query is executed on the first access path within the time segment;
  calculating execution costs associated with executing the query on the first access path and the at least one second access path; and
  identifying one of the first access path and the at least one second access path which has the lower execution cost, as the optimal access path.

16. The apparatus according to claim 15, the actions further comprise:
 saving the first access path and the at least one second access path for each of the time segments into a catalog table; and
 setting the optimal access path as active.

17. The apparatus according to claim 16, the actions further comprise:
 for a further time period corresponding to the specified time period,
  pre-loading the optimal access path corresponding to each of the time segments from the catalog table, before a start of each of the time segments; and
  executing the query on the optimal access path during each of the time segments.

18. A computer program product, comprising a computer readable storage medium having program instructions embodied therewith, the program instructions executable by a processing unit to cause the processing unit to perform actions of:
- collecting a plurality of real values of an access path factor during a specified time period, one of the real values being generated when a query is executed on a first access path;
- generating at least one second access path for the query, based on the plurality of real values of the access path factor, wherein the at least one second access path is calculated based on an average value of a filter factor, an average value of pre-fetch efficiency, and the average value of a buffer pool hit ratio, and wherein the generating further comprises:
  - dividing, by one or more processing units, the specified time period into a plurality of time segments, based on a frequency distribution of executing the query, wherein a clustering algorithm is applied against the frequency distribution; and
- identifying an optimal access path for the query from the first access path and the at least one second access path.

19. The computer program product according to claim 18, wherein dividing each time segment further comprises:
- calculating an average value of the access path factor based on the plurality of real values of the access path factor within the time segment; and
- calculating the at least one second access path based on the average value of the access path factor.

20. The computer program product according to claim 19, wherein identifying the optimal access path for the query comprises:
- for each of the time segments:
  - replaying a run-time environment under which the query is executed on the first access path within the time segment;
  - calculating execution costs associated with executing the query on the first access path and the at least one second access path; and
  - identifying one of the first access path and the at least one second access path which has the lower execution cost, as the optimal access path.

\* \* \* \* \*